US010643019B1

(12) United States Patent
Han et al.

(10) Patent No.: US 10,643,019 B1
(45) Date of Patent: May 5, 2020

(54) VIEW PRUNING FOR ROUTING TREE OPTIMIZATION

(71) Applicant: Cadence Design Systems, Inc., San Jose, CA (US)

(72) Inventors: Kwangsoo Han, Austin, TX (US); Zhuo Li, Austin, TX (US); Charles Jay Alpert, Cedar Park, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 29 days.

(21) Appl. No.: 16/228,494

(22) Filed: Dec. 20, 2018

(51) Int. Cl.
*G06F 17/50* (2006.01)
*G06F 30/398* (2020.01)
*G06F 30/327* (2020.01)
*G06F 30/3315* (2020.01)
*G06F 30/3312* (2020.01)
*G06F 30/337* (2020.01)
*G06F 30/3308* (2020.01)
*G06F 30/33* (2020.01)
*G06F 30/373* (2020.01)
*G06F 30/30* (2020.01)
*G06F 30/31* (2020.01)
*G06F 30/367* (2020.01)

(52) U.S. Cl.
CPC .......... *G06F 30/398* (2020.01); *G06F 30/327* (2020.01); *G06F 30/33* (2020.01); *G06F 30/337* (2020.01); *G06F 30/3308* (2020.01); *G06F 30/3312* (2020.01); *G06F 30/3315* (2020.01); *G06F 30/373* (2020.01); *G06F 30/30* (2020.01); *G06F 30/31* (2020.01); *G06F 30/367* (2020.01)

(58) Field of Classification Search
None
See application file for complete search history.

(56) References Cited

U.S. PATENT DOCUMENTS

| 6,988,255 | B2 * | 1/2006 | Allen | G06F 30/3312 716/103 |
| 7,681,157 | B2 * | 3/2010 | Buck | G06F 30/3312 716/113 |
| 7,707,533 | B2 * | 4/2010 | McConaghy | G06F 30/367 716/119 |
| 8,713,502 | B1 * | 4/2014 | Date | G06F 30/3312 716/113 |
| 9,141,742 | B2 * | 9/2015 | Tsai | G06F 30/327 |
| 9,384,310 | B1 * | 7/2016 | Keller | G06F 30/3312 |

(Continued)

*Primary Examiner* — Leigh M Garbowski
(74) *Attorney, Agent, or Firm* — Schwegman Lundberg & Woessner, P.A.

(57) ABSTRACT

Electronic design automation systems, methods, and media are presented for view pruning to increase the efficiency of computing operations for analyzing and updating a circuit design for an integrated circuit. One embodiment involves accessing a circuit design stored in memory that is associated with a plurality of views, selecting a first view of the plurality of view for view pruning analysis, and identifying a plurality of input values for the first view of the plurality of views. Random nets are generated based on the views, view inputs, and pruning thresholds. Certain views are then selected as dominant based on a comparison of the output slews different nets and views. Subsequent analysis is then performed and used to update the design without using the pruned views (e.g., using the selected dominant views).

20 Claims, 12 Drawing Sheets

(56) References Cited

U.S. PATENT DOCUMENTS

| | | | |
|---|---|---|---|
| 10,255,403 B1* | 4/2019 | Saurabh | G06F 30/3312 |
| 10,380,299 B2* | 8/2019 | Sunder | G06F 3/04847 |
| 2004/0148578 A1* | 7/2004 | McConaghy | G06F 30/36 |
| | | | 716/102 |
| 2006/0107244 A1* | 5/2006 | Yonezawa | G06F 30/30 |
| | | | 716/113 |
| 2009/0199143 A1* | 8/2009 | Schlotman | G06F 30/3312 |
| | | | 716/113 |

* cited by examiner

VIEW PRUNING FOR ROUTING TREE OPTIMIZATION

TECHNICAL FIELD

Embodiments described herein relate to electronic design automation (EDA), and to systems, methods, devices, and instructions to perform timing analysis as part of design, verification, and generation of circuit designs.

BACKGROUND

Electronic design automation (EDA) is a category of systems for assisting with the design of electronic systems and devices. Large, integrated circuit designs are often assembled from previously designed blocks or generic designs which may include various combinations of elements. This enables reduced turnaround times for generation of an integrated circuit. Schematic and layout information for such block portions of a design may be exchanged or licensed as intellectual property. During design of a specific circuit, large numbers of combinations of different variables that go into a design may require significant resources to verify that all acceptable combinations will function properly.

BRIEF DESCRIPTION OF THE DRAWINGS

Various ones of the appended drawings merely illustrate example embodiments of the present disclosure and should not be considered as limiting its scope.

DETAILED DESCRIPTION

Embodiments described herein relate to EDA and to methods, computer media, and devices used for analyzing, optimizing, and creating electronic circuits. One of the many complex elements of circuit design is the generation of routing trees that convey a signal from a signal origin, or source, to a signal destination, or sink. A clock tree, for example, has a single source and may be attached to hundreds or thousands of destination sinks. Additionally, the design may have limits on the slew rate, which is a value that reflects the rate of change of signals in a system (e.g., a rate of change in voltage over time). To ensure that a circuit design works as planned, a design team uses various analysis processes to determine if the various clocks and signals within a circuit design are correctly implemented. Incorrect implementation may prevent a circuit from functioning under certain operating conditions, while it may function normally during other conditions. Because of this, circuit modeling may simulate operation under different conditions, which are referred to as "views".

Embodiments described herein include systems and methods for "pruning" or reducing the number of views which are analyzed in order to increase computing device efficiency, and reduce the analysis time of certain EDA operations. In certain embodiments, for example, a small set of views, referred to as "dominant views," are identified that represent the relevant information for a circuit design, such that if the dominant views meet the relevant criteria, the non-dominant views will also meet the criteria. These identified dominant views may be identified at the beginning of clock tree synthesis (CTS), and the CTS operations may only use the target slews of dominant views during CTS in order to improve computing device efficiency and reduce CTS runtime on an EDA machine.

Figure 1:
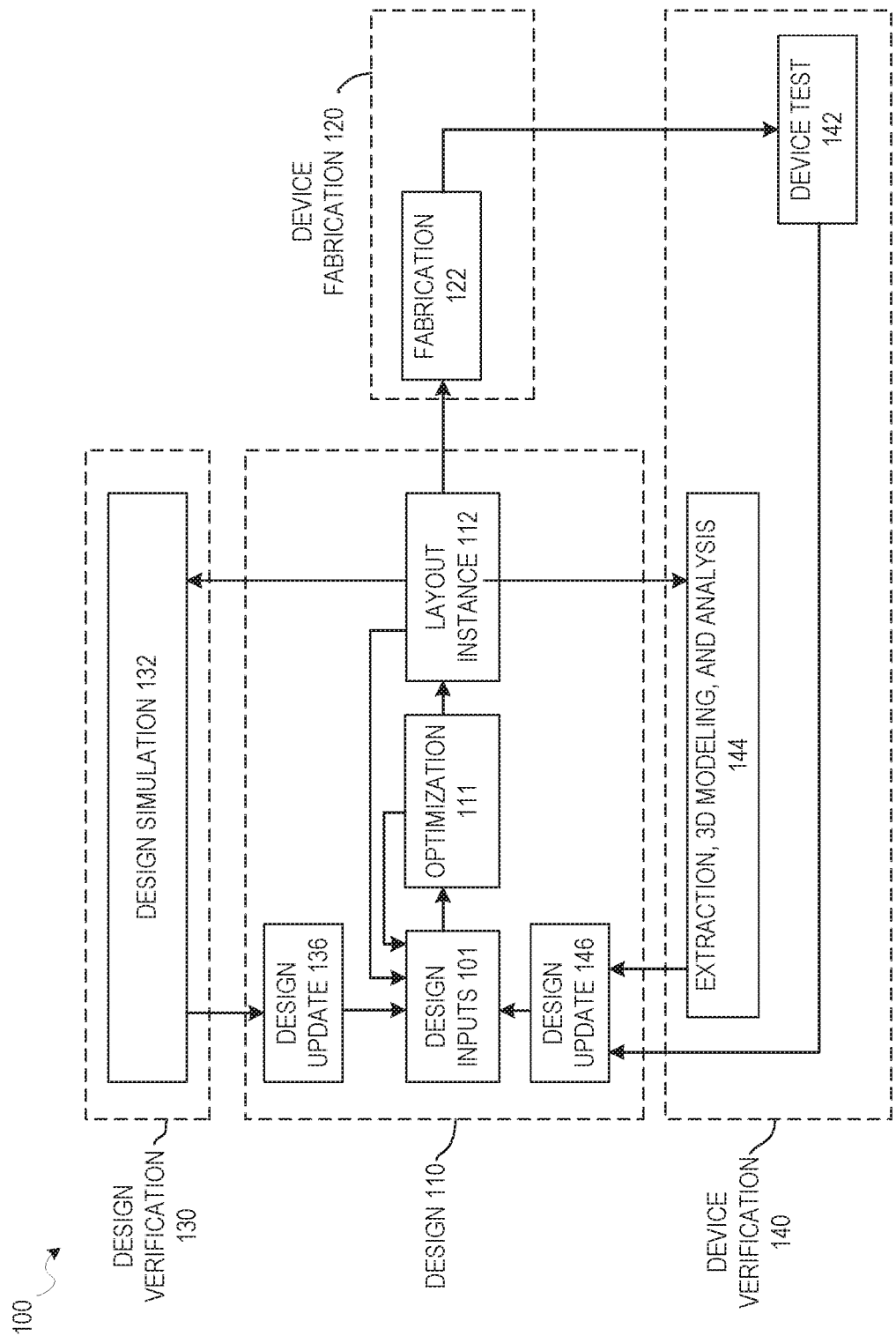
FIG. 1 is a diagram illustrating one possible design process flow for generating a circuit including embodiments to meet timing constraints according to some embodiments.

FIG. 1 is a diagram illustrating one possible design process flow which includes elements for view pruning and routing tree optimization as part of circuit design, in accordance with some embodiments. This includes possible design process flows for timing and signal integrity analysis to generate a circuit design and an associated circuit and operations for automatically modifying such circuits to generate structures that comply with limits on slew rates and other such timing considerations. It will be apparent that other design flow operations may function using the timing constraints and optimizations described herein, but design flow 100 is described here for the purposes of illustration. As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where initial layouts for a clock tree structure and sinks are generated, before adjustments are made to ensure that timing requirements for each sink are met. The initial strategy, tactics, and context for the device to be created are also generated in the design input operation 101, depending on the particular design algorithm to be used.

In some embodiments, following an initial selection of design values in design input operation 101, a routing tree may be generated, in accordance with various embodiments described herein, during optimization operation 111 or layout instance 112, along with any other automated design processes. As described below, design constraints for a routing tree structure and sinks which receive a signal from the routing tree structure may be initiated with design inputs in design input operation 101, and then may be analyzed and optimized using timing analysis according to various embodiments. While design flow 100 shows such optimization occurring prior to layout instance 112, updates to a routing tree may be performed at any time to improve expected operation of a circuit design. For example, in various embodiments, constraints for blocks in a circuit design may be generated prior to routing of connections in a circuit design, after routing, during register transfer level (RTL) operations, or as part of a final signoff optimization or verification prior to a device fabrication operation 122. Certain embodiments of operations described herein for generating or updating a routing tree structure may therefore involve iterations of design input operation 101, optimization operation 111, and layout instance 112 generation. In other systems, other design processes may be used.

Additionally, as part of a design process, various operating conditions (e.g. "corners" or "views") are considered. Operation at the different views may be modeled, and changes to the design made to optimize the operation across different views. Such views may, for example, include voltage conditions, temperature conditions, interconnect conditions, or other such conditions. Additionally, testing for these conditions may be checked for each operating mode (e.g. power saving, high performance, standby, etc.). An example embodiment may include three voltage condition corners (e.g. high, low, and typical), three temperature conditions (e.g. high, low, and typical), and five interconnect conditions (e.g. maximum capacitance, minimum capacitance, maximum resistance times capacitance (RC), maximum RC, and typical), which would be 45 views (e.g. 3×5×3). In systems with additional condition types and additional numbers of options for each condition type, the total number of views to be considered may be many hundreds or thousands of views. Analyzing a design for such large numbers of views may be a resource intensive process.

After design inputs are used in design input operation 101 to generate a circuit layout, and any optimization operations 111 are performed, a layout is generated in layout instance 112. The layout describes the physical layout dimensions of the device that match the design inputs. This layout may then be used in a device fabrication operation 122 to generate a device, or additional testing and design updates may be performed using designer inputs or automated updates based on the design simulation 132 operations or extraction, 3D (three-dimensional) modeling, and analysis 144 operations. Once the device is generated, the device can be tested as part of device test 142 operations, and layout modifications generated based on actual device performance.

Design updates 136 from design simulation 132, design updates 146 from device test 142 or extraction, 3D modeling, and analysis 144 operations, or direct design input operation 101 may occur after an initial layout instance 112 is generated. In various embodiments, whenever design inputs are used to update or change an aspect of a circuit design, a timing analysis and optimization operation 111 may be performed.

Figure 2:
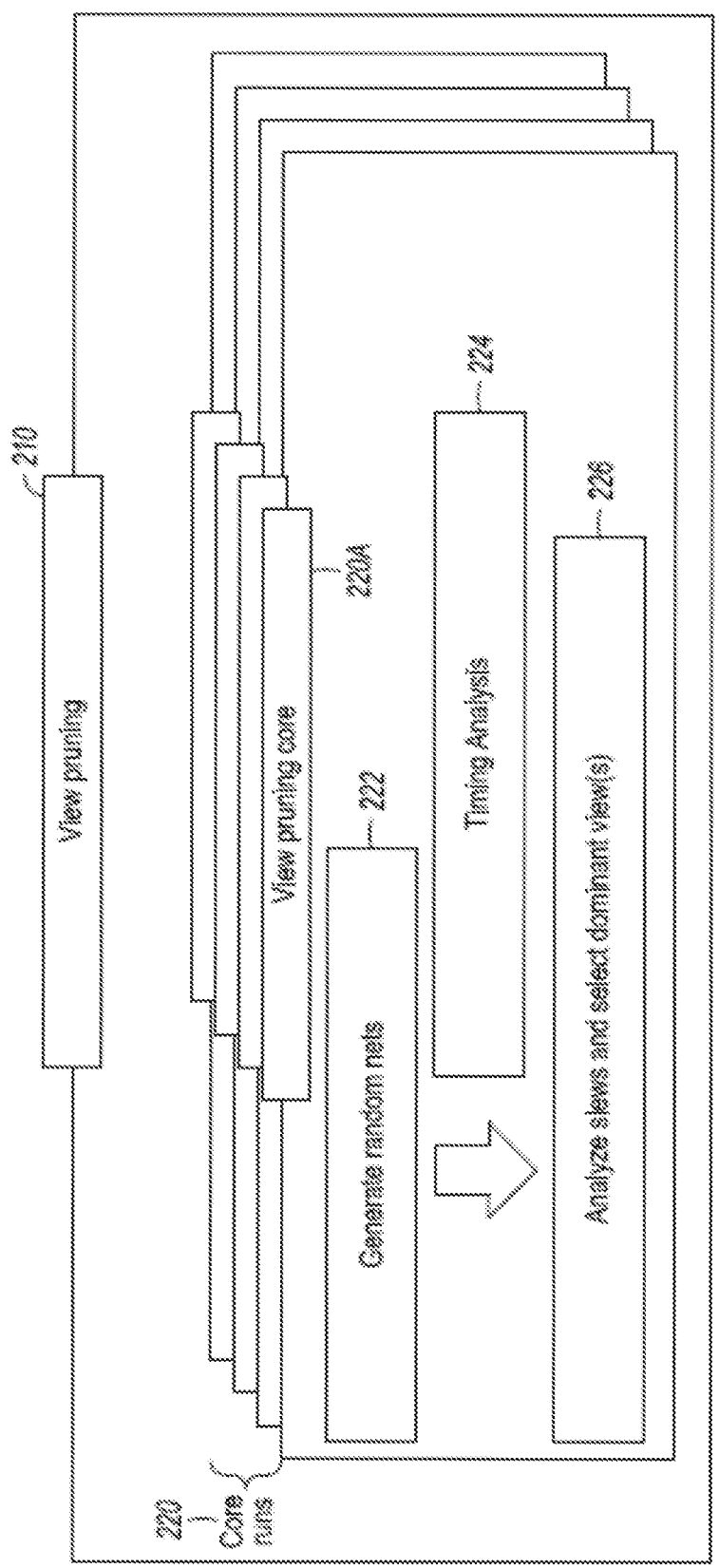
FIG. 2 illustrates aspects of view pruning for routing tree optimization in accordance with some embodiments.
Figure 3:
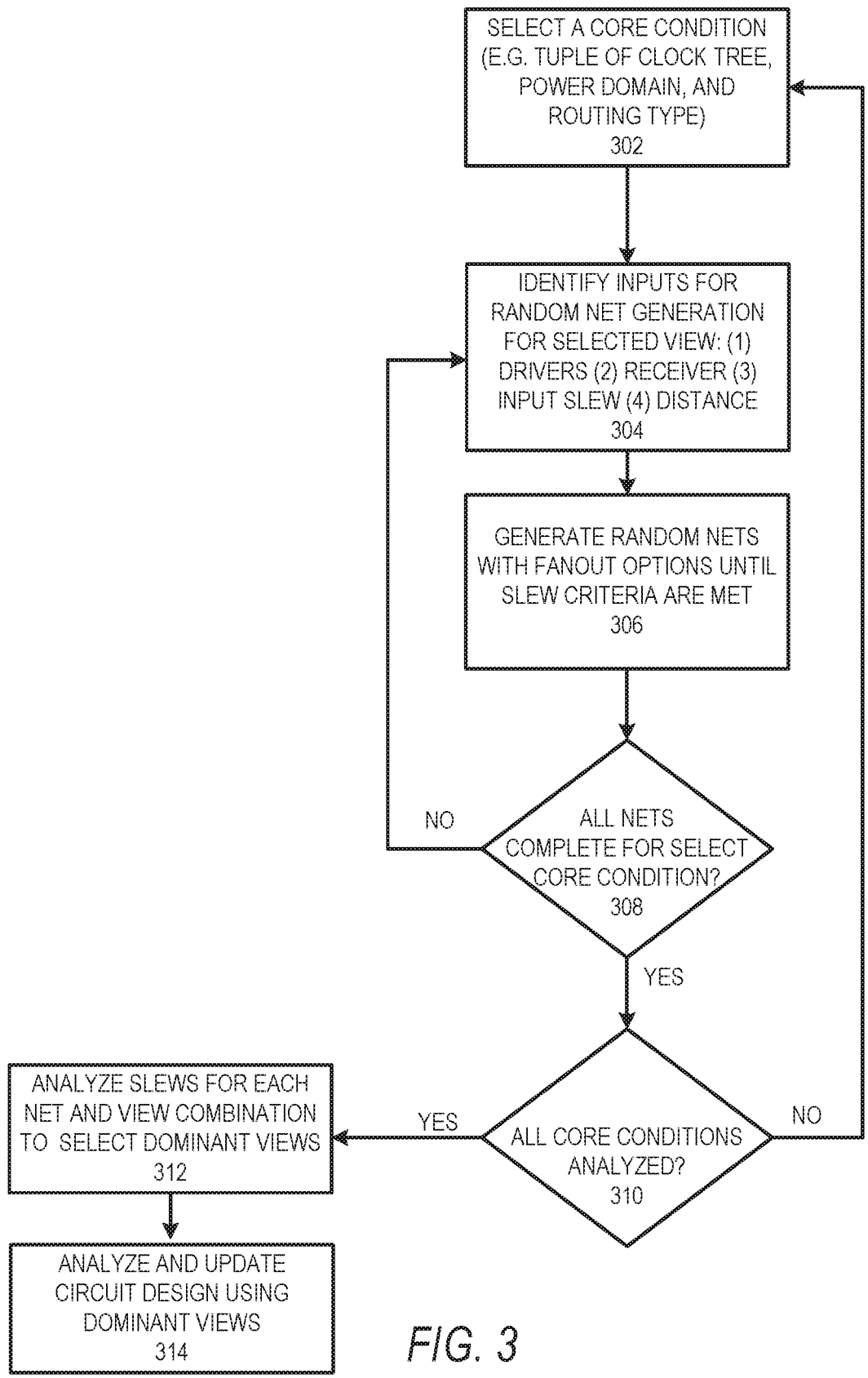
FIG. 3 illustrates aspects of view pruning for routing tree optimization in accordance with some embodiments.
Figure 11:
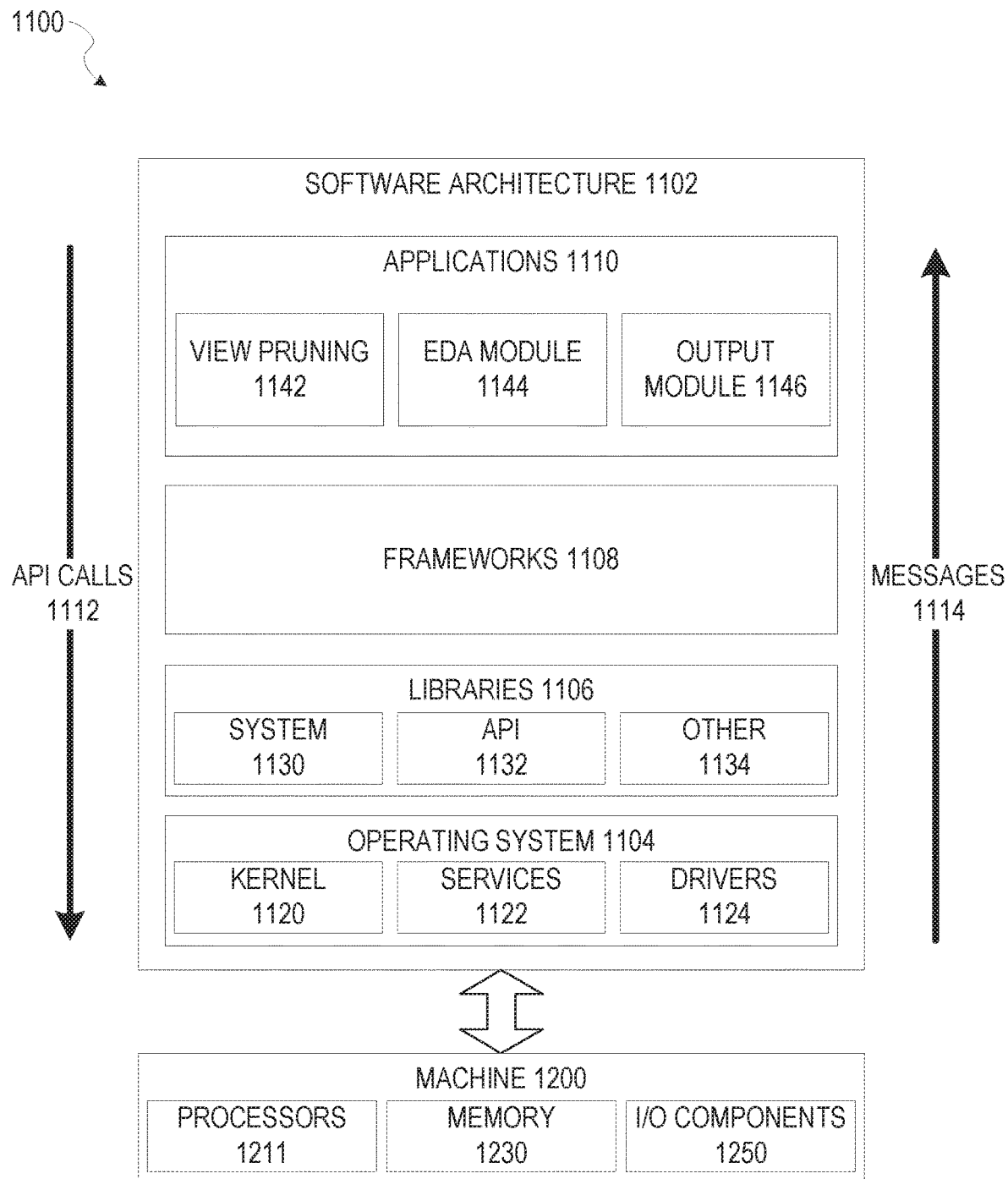
FIG. 11 is a block diagram illustrating an example of a software architecture that may be operating on an EDA computer and used with methods for routing tree generation to update a circuit design, according to some example embodiments.

FIGS. 2 and 3 illustrate aspects of view pruning for routing tree optimization in accordance with some embodiments. FIG. 2 illustrates view pruning 210 operations which may, for example, be implemented as a view pruning module 1142 or as part of any other such application 1110 by a machine 1200 as illustrated by FIG. 11. View pruning 210 of FIG. 2 includes multiple repetitions of pruning operations for core runs 220. Each of core runs 220 is a view pruning core with multiple operations. An illustrated core run 220, shown as view pruning core 220A, involves generation of a random net 222 and timing analysis 224 operations which are performed on the generated random net 222. Then, the slews from the timing analysis 224 are analyzed to select one or more dominant views in operation 226. This view pruning 210 of various views analyzed as part of core runs 220 addresses long clock tree synthesis runtimes due to large numbers of views in some systems. View pruning 210 enables identification of a smaller set of views at the beginning of tree synthesis operations in order to limit the number of views and the target slews that are analyzed during tree synthesis operations.

In certain embodiments, improvements described herein are enabled by use of random nets. For certain systems, the real nets and random nets have comparable slew coverage and slew ratios. Such systems include trunk routes and leaf routes. As described herein, a trunk route is a net that drives multiple buffers. A leaf net is a net that drives at least one flip-flop. Due to characteristics of leaf nets and trunk nets, some embodiments described herein are limited to systems which include only such nets or nets with comparable characteristics where random and real nets have comparable slew coverage and slew ratios. This allows such systems to be analyzed using random nets, which requires fewer resources than analysis of real nets. In some systems, a clock tree is primarily trunk nets, where a receiver system is more likely to include both trunk nets and leaf nets. Selection of circuit elements for such different nets are considered when selecting receiver elements and driver elements as described below.

Without view pruning 210, a run is performed for each view of the circuit design system (e.g., every circuit element option, temperature condition, voltage condition, operating condition, etc.). This results in an excessive number of runs and inefficient use of computing resources. Embodiments described herein consider particular inputs for view pruning cores (e.g. each tuple of clock tree, power domain, and routing type) which may be used with random nets to select dominant views and prune (e.g., ignore) remaining views. The view pruning is performed for each tuple of the clock tree, power domain, and routing type set (e.g. each view pruning core) due to the potential for dominant views to be different for each of these tuples.

FIG. 3 provides additional detail as part of an alternative description of the view pruning 210 operations of FIG. 2. As illustrated by FIG. 3, a core condition is selected in operation 302. This core condition is one of the view pruning cores for a core run, with different core conditions considered separately for pruning in accordance with embodiments described herein. This is because different core conditions may (but do not necessarily) result in different dominant views and view pruning. For example, if ten views are present for two different core runs, and views 1 and 3 are dominant for the first core run, and views 3 and 5 are dominant for the second core run, then views 1, 3, and 5 may be selected as the total set of dominant views for the circuit design. For the selected core condition, inputs for random net generation for the selected view are identified in operation 304. In some embodiments these include selection of driver information, receiver information, input slew information, and distance information. Random nets for this input information are then generated with various fanout options until slew criteria are met in operation 306. This process of operations 304 and 306 is then repeated as shown by decision operation 308 until all nets are considered for a selected core condition. Then, at decision 310, a new core condition is selected and the previous operations can further repeat until all nets for all core conditions are completed. Then, in operation 312, slews for each net are analyzed and used to select dominant views. As discussed above, this may involve identifying and merging sets of dominant views from different core conditions, though every core condition will not necessarily result in any dominant view. Further, different embodiments may use different sets of criteria for determining dominant views, as detailed further below. Subsequent synthesis operations may then proceed using the dominant views and ignoring pruned views in operation 314.

Some embodiments may have circuit designs which include route types which are not compatible with such view pruning. In such embodiments, these view pruning operations may be used for the applicable routes (e.g., leaf and trunk routes) while the full set of core runs or other timing analysis operations are used for other routes.

The inputs used for the various view pruning cores may also be limited in various ways to improve efficiency while maintaining effective analysis of the different views in an appropriate selection of the dominant views. As described above, the inputs for a view pruning core may include a set of drivers, a set of receivers, a set of distances, and a set of input transmissions (e.g., associated with a target slew for a primary corner). This information, along with fanout selection options, is assumed as available input data. Such data may be accessed from circuit design information stored in memory or may be provided by a designer inputting data into a system. Other data that may be used for input selection includes a target slew for a primary corner of a net, a maximum fanout, and various circuit element selections.

The drivers and receivers (e.g., circuit elements) may be different for each core run, or may be the same dependent on various aspects of a particular design. Table 1 illustrates a further aspect of the input data used for view pruning in some embodiments.

TABLE 1

|  | T1 | T2 | T3 | T4 | T5 | T6 |
|---|---|---|---|---|---|---|
| Set of Cells | D1 | D1 | D2 | D2 | D1 | D2 |

In table 1, six sets of views are illustrated. Each view is associated with a set of cells. By identifying views which share similar sets of cells, a limited number of buffers, inverters, and clock gates that are part of the different sets of cells may be identified and used to limit the circuit elements that are considered in the various core runs that are analyzed during view pruning operations.

The selection of cells (e.g., circuit elements) may follow different processes in different embodiments. In one embodiment, selection of circuit elements for drivers may involve selection of multiple drivers having different characteristics. As detailed above, certain embodiments are limited to trunk routes, leaf routes, or other similar routes while excluding other types of routes. The trunk and leaf routes have the same criteria for driver selections that are considered during view pruning operations in accordance with embodiments described herein. Thus, when a system analyzes all of the buffer, inverter, and clock gate elements which may be part of a circuit design, the system selects three buffer/inverter elements and one clock gate element. For example, if 20 buffer elements, 20 inverter elements, and 15 clock gate elements are provided as part of a circuit design, the view pruning system will select three buffer elements and one clock gate element and will ignore the other elements as part of the view pruning. This selection of circuit elements is optimized for the corner or extreme conditions which will be seen in different views. Selection of weak, a strong, and medium buffer elements will provide the trend views with the most likely problem situations. Because of this, considering other elements is largely redundant. Similarly, a medium strength clock gate element will provide the view pruning operations described herein with appropriate driver data for selecting views and ignoring other views. While certain circuit designs and embodiments operate using such driver selections, other embodiments may filter driver data as part of view pruning in other ways.

While leaf and trunk routes have similar criteria for driver selection, they have different criteria for receiver selection. For leaf routes, the initial design may be analyzed to identify the most used flip-flop elements that are relevant to receiver elements. A view pruning system may select a number of the most used flip-flop elements. For example, one embodiment may select the three most used flip-flop elements in the circuit design. Trunk routes may similarly identify most used flip-flops, but may also identify a medium strength buffer/inverter element and a medium strength clock gate. As described herein, circuit element "strength" refers to an overall evaluation of the circuit characteristics relevant to slew. Various different embodiments may consider such strengths in different ways to arrive at the appropriate selection of circuit elements for use during view pruning operations.

As mentioned above, an input signal to the driver is also one of the inputs considered. In some embodiments, different input slew values may be selected as follows. A target maximum slew is identified, and then different slew values between 0 and the target maximum slew are selected. For example, if the target maximum slew is 60 picoseconds (ps), a set of input slews may be selected at 15 ps, 30 ps, 45 ps, and 60 ps. In various embodiments, different numbers of slew inputs and different maximum slew rate values may be used depending on the specific criteria for a circuit design.

Figure 4:
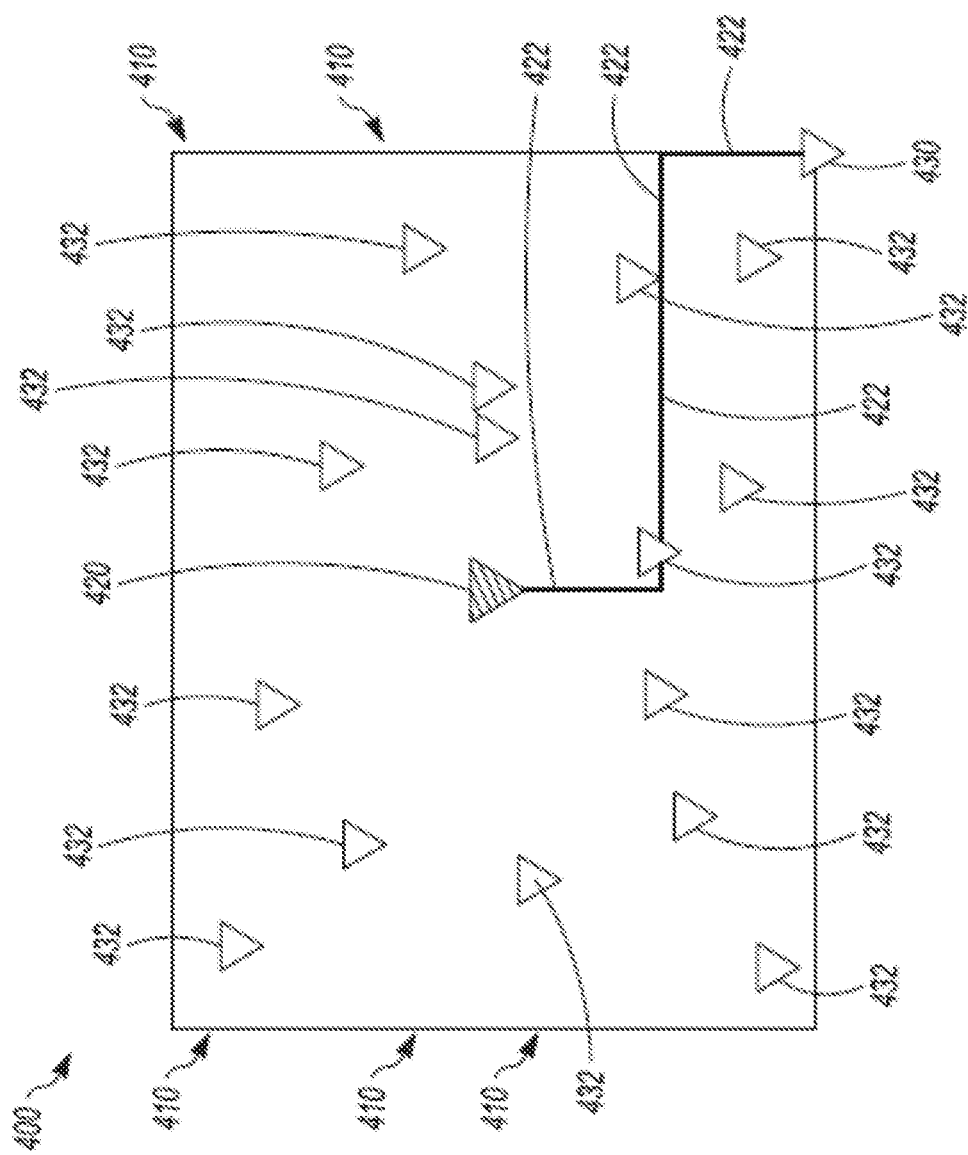
FIG. 4 illustrates aspects of view pruning and an associated randomly generated fanout for routing tree optimization in accordance with some embodiments.

FIG. 4-8 illustrate aspects of view pruning and an associated randomly generated fanout for routing tree optimization in accordance with some embodiments. Another of the input considerations mentioned above is a maximum distance selection. This distance value may, for example, be the maximum possible Manhattan length set within a circuit design for a distance between a driver and a receiver. Other circuit designs may have similar maximum distance values for such limitations for driver and receiver connection distances. FIG. 4 illustrates a random fanout 400 which includes a driver 420 a maximum distance receiver 430, and additional receivers 432. Route 422 is a route with a link equal to the maximum distance value. Bounding box 410 shows all possible placement options for receivers within the random fanout 400.

For generating random nets as part of pruning operations, random fanouts such as random fanout 400 are generated with random placement of circuit elements. For such random fanouts, the driver is set at the center of the bounding box 410 as illustrated by driver 420 and bounding box 410. For the other circuit elements (e.g., receivers 430 and 432), a target fan out value is used to identify the number of circuit elements that are placed within the bounding box 410 to create a random fanout. Each of the additional circuit elements are placed at varying distances from the driver 420. In some embodiments, the distance and placement are random. In other embodiments, the distances are spread evenly from an initial step distance to a distance threshold value (e.g., the maximum driver-receiver Manhattan distance illustrated by route 422). For example, with a distance threshold of 30 micrometers (μm), receivers 432 may be placed randomly at Manhattan distances of 3, 6, 9, 12, 15, 18, 21, 24, and 27 μm from driver 420, and receiver 430 is at a distance of 30 μm (e.g., the distance threshold value) from driver 420.

With placement of the plurality of circuit elements of the random fanout complete, and the driver values, the receiver values, and the input slew provided as input values, a slew value is calculated for each circuit element of the random fanout (e.g., receivers 430 and 432). These slew values are then compared against one or more view pruning thresholds. For example, each slew value may be compared with an acceptable slew window, which is set as a window between an upper bound and a lower bound. In order to determine if the random fanout 400 will be selected as a random net for view pruning, the slew values are compared against the view pruning thresholds. In one embodiment, a random fanout is selected as a random net if every slew value for every circuit element in a fanout is less than a slew window maximum value and at the least one of the slew values is above the slew window minimum value.

Figure 5:
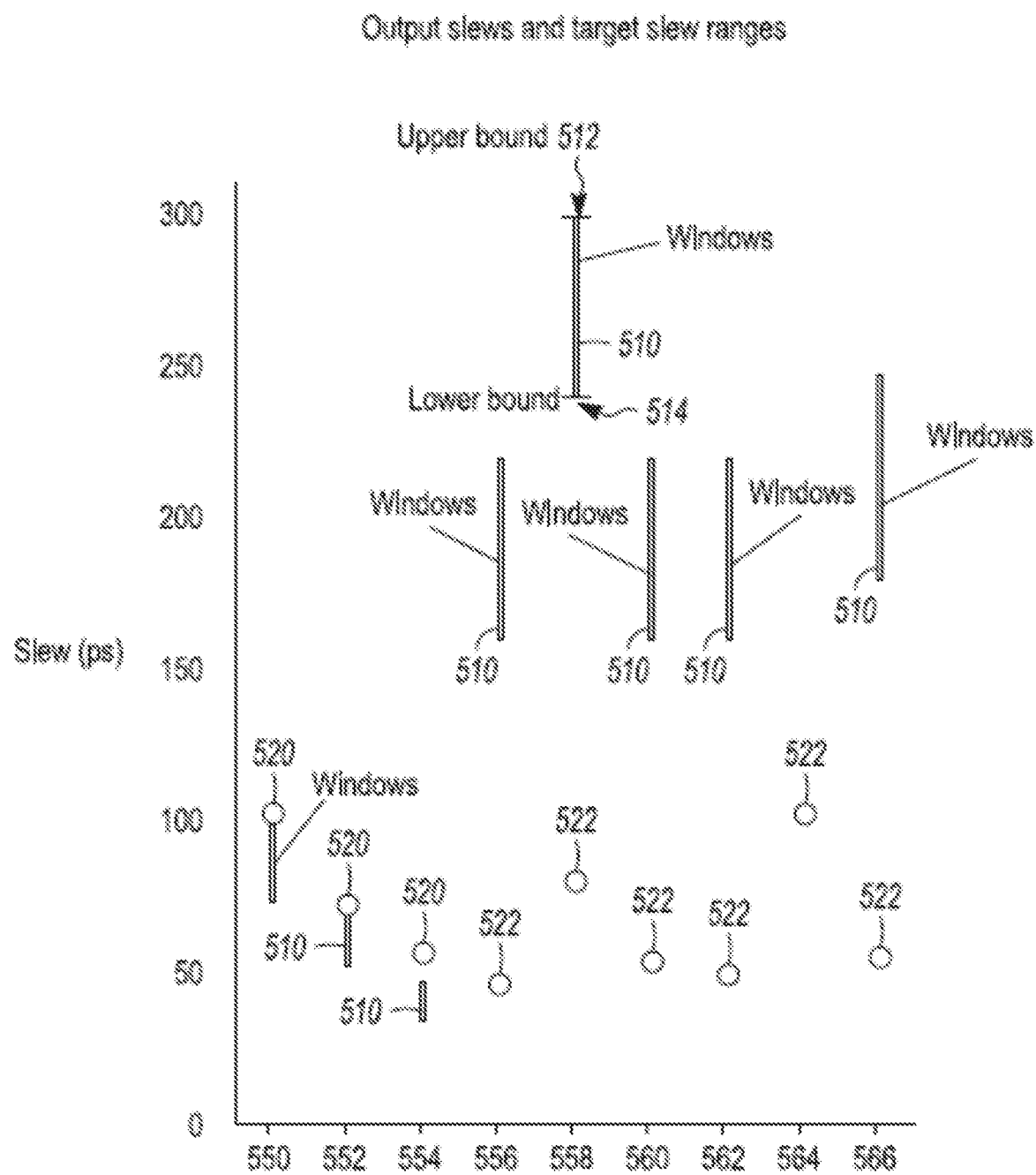
FIG. 5 illustrates aspects of view pruning slew values for circuit elements in a randomly generated fanout used for routing tree optimization in accordance with some embodiments.

FIG. 5 illustrates a chart of slew values 520 and 522 and associated boundary windows 510 for a first random fanout (e.g., random fanout 400) having a plurality of circuit elements 550-566. As illustrated, each circuit element 550-566 has a charted slew value, shown as slew values 520 and slew values 522. Each slew value is also shown with an associated window 510. Each window 510 has an associated upper bound 512 (e.g., a slew window maximum value) and an associated lower bound 514 (e.g., a slew window minimum value). The window for each slew value of each circuit element 550-566 will be determined by criteria of the circuit design and the input values (e.g., input slew, position, driver and receiver element values, etc.). In some embodiments these criteria identify a target value, and each window 510 is an acceptable percentage above and below the target value for each circuit element 550-566 (e.g., receivers 430 and 432) as positioned in the random fanout. In one embodiment, the upper bound 512 is set at 10% above the target value and the lower bound 514 is set 10% below the target value. In other embodiments, other window criteria may be used.

These slew values 520 and 522 are then compared against windows 510 to determine if the random fanout is selected as a random net. In the example of FIG. 5, slew values 520 are above their corresponding windows 510 while slew values 522 are below their corresponding windows 510. The random fanout of FIG. 5 does not meet a view pruning threshold, which requires every slew value to be below the upper bound 512 of its corresponding window 510. In such a case, the random fanout is rejected and a new random fanout is generated using an updated fanout value (e.g., a value adjusting the number of receiver elements placed in the next random fanout).

Figure 6:
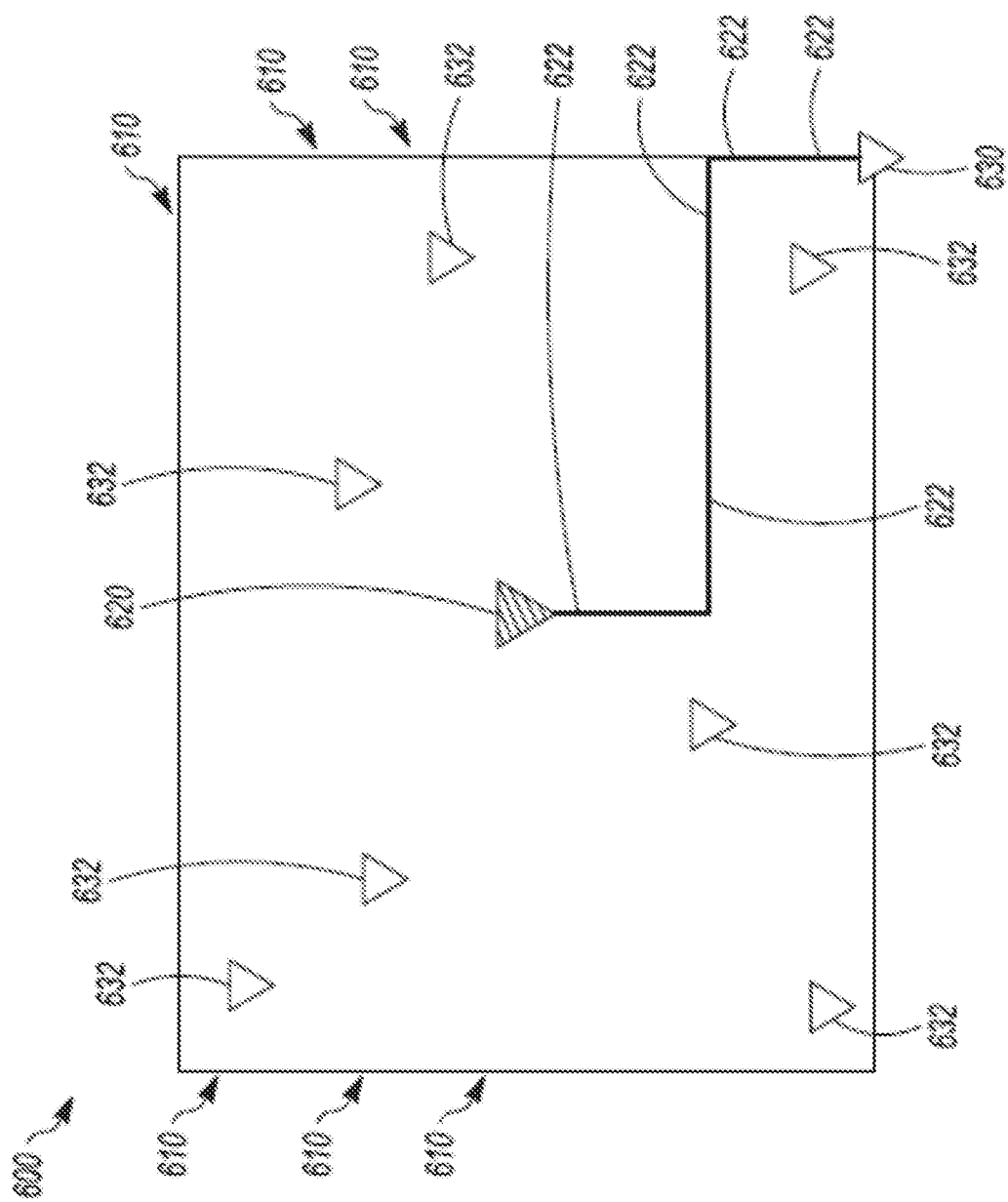
FIG. 6 illustrates aspects of view pruning and an associated randomly generated fanout for routing tree optimization in accordance with some embodiments.
Figure 7:
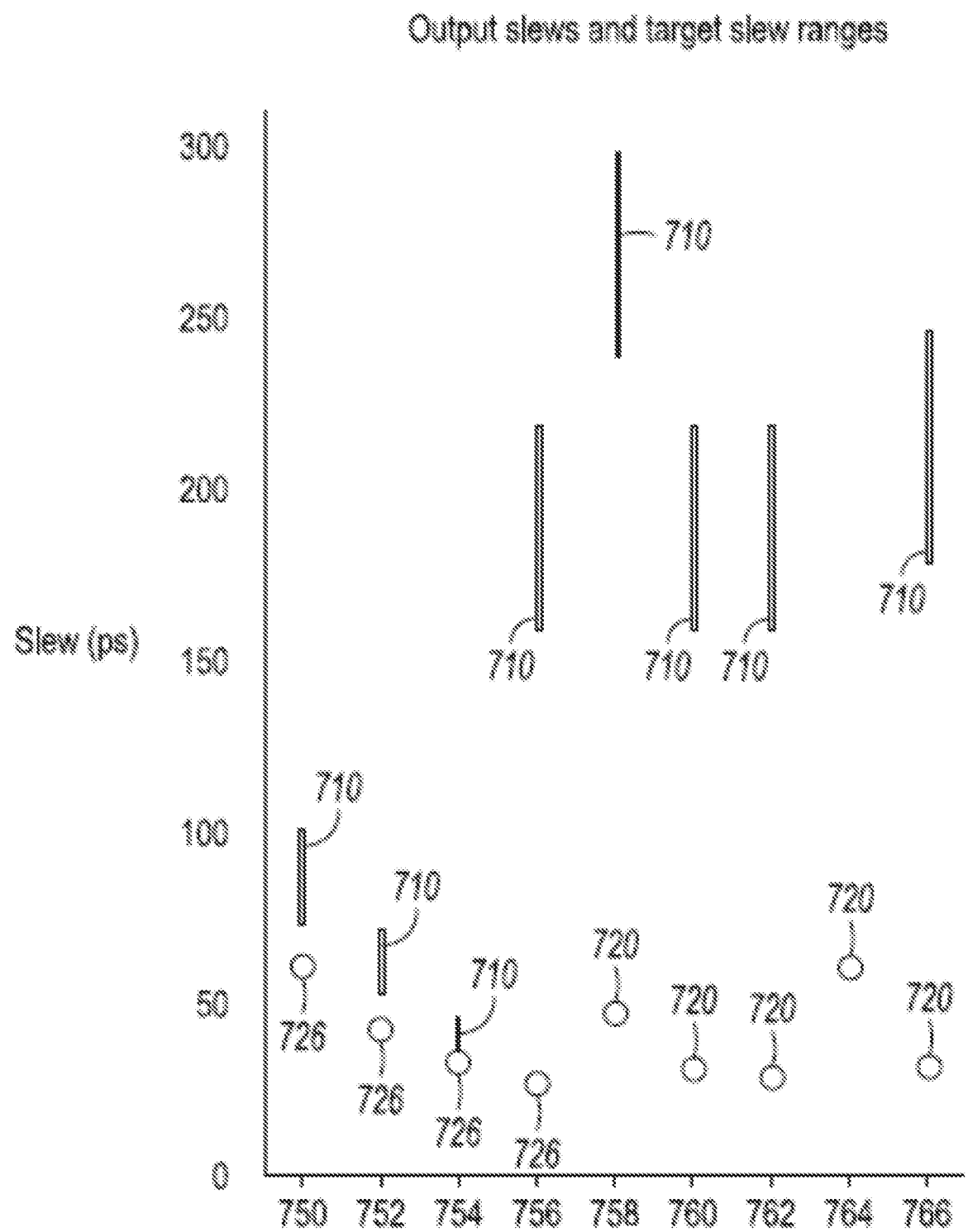
FIG. 7 illustrates aspects of view pruning slew values for circuit elements in a randomly generated fanout used for routing tree optimization in accordance with some embodiments.
Figure 8:
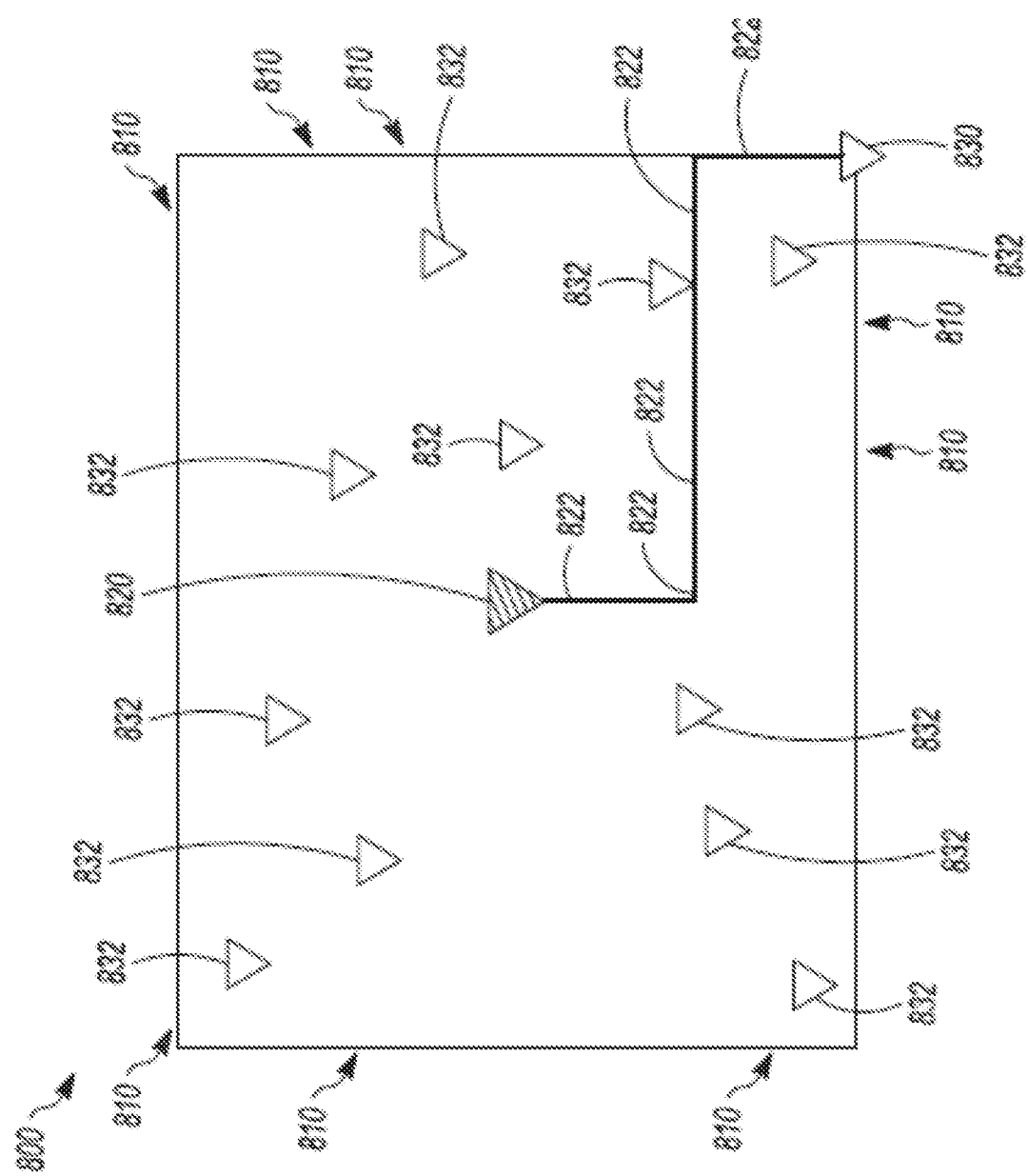
FIG. 8 illustrates aspects of view pruning and an associated randomly generated fanout for routing tree optimization in accordance with some embodiments.
Figure 9:
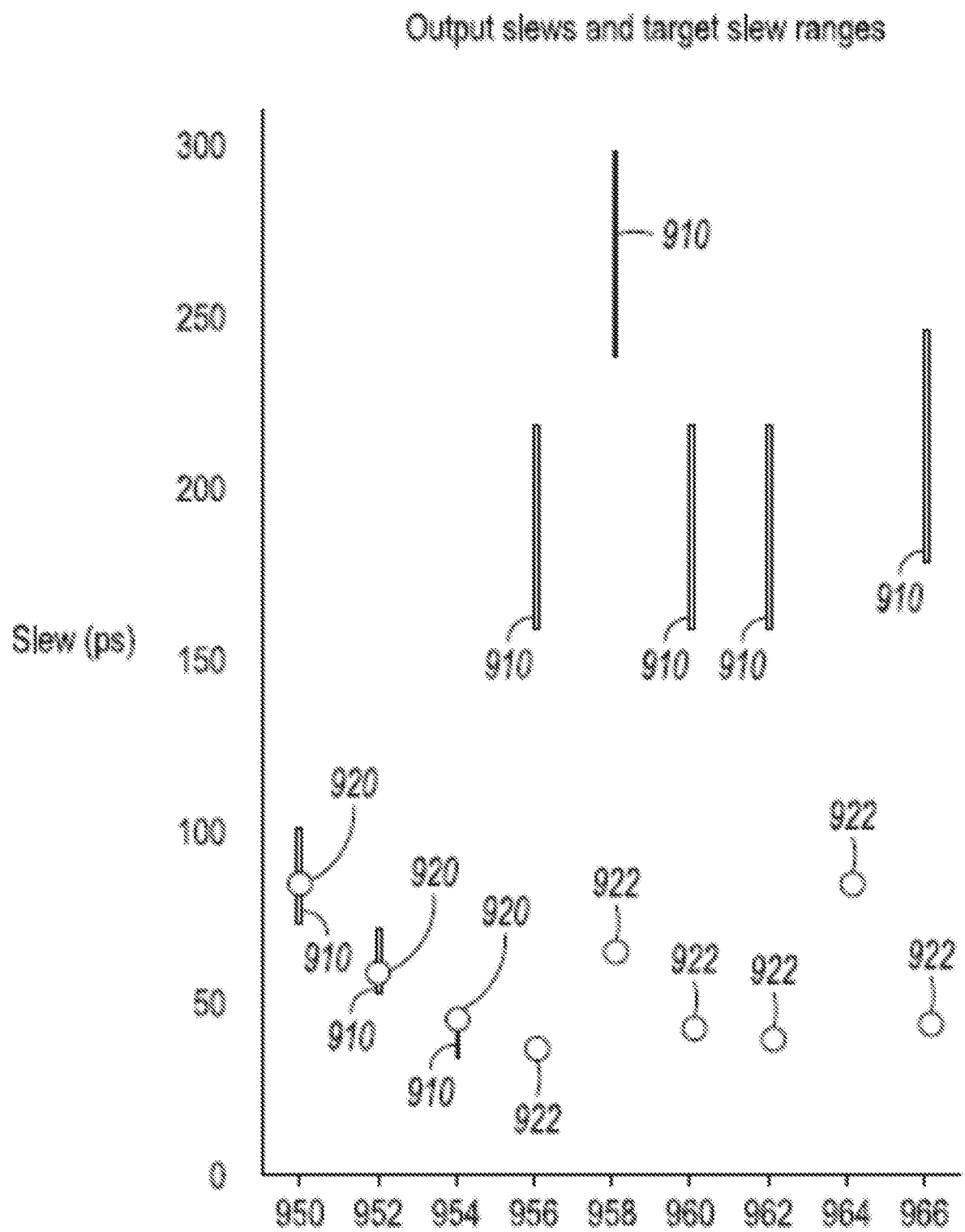
FIG. 9 illustrates aspects of view pruning slew values for circuit elements in a randomly generated fanout used for routing tree optimization in accordance with some embodiments.

FIGS. 6 and 8 illustrate random fanouts which may be generated following the failure of random fanout 400 to meet the view pruning threshold for selecting a random net. FIGS. 7 and 9 are charts of the corresponding slew values and associated windows. FIG. 6 shows random fanout 600 having boundary area 610, driver 620, maximum distance receiver 630 placed at a maximum distance value along route 622, and additional receivers 632. FIG. 7 shows example slew values 720 and associated windows 710 for example circuit elements 750-766 (e.g., corresponding to receivers 630 and 632). Similarly, FIG. 8 shows random fanout 800 having boundary area 810, driver 820, maximum distance receiver 830 placed at a maximum distance value along route 822, and additional receivers 832. FIG. 9 shows slew values 920 and 922 with associated windows 910 for circuit elements 950-966. These values and the corresponding random fanouts are illustrative only and do not directly represent values for each receiver shown in the random fanout. An actual chart for the illustrated fanouts would have a slew value and window for each illustrated receiver. For example, FIG. 4 shows a fanout value of 16, with 16 illustrated receiver elements, and would therefore have 16 slew values, with a slew value for each receiver element. Similarly, FIG. 6 has a fanout value of 8, with 8 receiver elements, and FIG. 8 has a fanout value of 12, with 12 receiver elements.

FIGS. 4-9 may be used to illustrate the selection of a random net generated by initially rejecting two random fanouts (e.g., random fanouts 400 and 600), and selecting a third random fanout (e.g., random fanout 800). As mentioned above, slew values 522 are each above the upper bound 512 of the corresponding windows 510, and thus the associated random fanout 400 is rejected. A new fanout value is then selected and a new fanout (e.g., random fanout 600) is generated. Every slew value 720, however, is below the lower bound of the associated window 710, and the new random fanout also fails the threshold test. Another new random fanout is then generated (e.g., random fanout 800). The slew values 920 and 922 meet the threshold criteria because no slew values are above the maximum window and some slew values are within the window. The slew values for the corresponding random fanout thus meet the criteria that no slew values be above the slew window maximum and all of the slew values cannot be below the corresponding slew window minimum. Based on the slew values for the random fanout meeting this threshold, the random fanout is selected as a random net.

This process is then repeated to generate nets for all applicable portions of circuit design, and each net is analyzed to identify a view that gives the worst slew value for each net. The information from this analysis is then used to select certain views as dominant and to prune (e.g., ignore or remove from further analysis) non-dominant views. This pruning may be done either using calculated slew values without considering target slews, or using scale slew values which consider target slews.

Table 2, for example, illustrates a naïve view selection which does not consider target slews. Table 2 is an example with 5 random nets and 3 views which are analyzed to determine which views are dominant for the random nets.

TABLE 2

| Slew value | $Net_1$ | $NET_2$ | $NET_3$ | $NET_4$ | $NET_5$ | View dominant for # of nets |
|---|---|---|---|---|---|---|
| $View_1$ | 45 | 60 | 60 | 30 | 40 | 4 |
| $View_2$ | 35 | 50 | 55 | 40 | 35 | 1 |
| $View_3$ | 30 | 33 | 32 | 30 | 20 | 0 |

For the simple example of table 2, view 1 provides the worst slew for nets 1-3 and 5. View 2 provides the worst slew for net 4. Views 1 and 2 are thus identified as dominant views and view 3 is pruned. In other words, views 1 and 2 provide the worst case scenarios for all of the generated random nets, and view 3 is less redundant. Pruning view 3 so that view 3 is not part of the subsequent analysis of the circuit design provides significant efficiency gains in analysis and updating of circuit design.

TABLE 3

| Slew value | Target slew | Scaling factor | $Net_1$ | $NET_2$ | $NET_3$ | $NET_4$ | $NET_5$ | View dominant for # of nets |
|---|---|---|---|---|---|---|---|---|
| $View_1$ | 60 | 1 | 45 | 60 | 60 | 30 | 40 | 0 |
| $View_2$ | 50 | 1.2 | 42 | 60 | 66 | 48 | 42 | 2 |
| $View_3$ | 30 | 2 | 60 | 66 | 64 | 60 | 40 | 3 |

Table 3 illustrates pruning using target slews. In table 3, each view is associated with a target slew and an associated scaling factor. The target slew and scaling factor are used to adjust the worst-case slew for each net and view. The values in the cells corresponding to view-rows and net-columns in table 3 are slew values which are adjusted based on the corresponding target slew and scaling factor. Any view having the worst adjusted slew for any net is then identified as a dominant view. In the example of table 3, view 3 has the worst values for nets 1, 2, while view 2 has the worst values for nets 3 and 5. Views 2 and 3 are thus identified as dominant views, and view 1 is a nondominant view which will be pruned. Tables 2 and 3 illustrate two possible options for pruning views once the nets are generated and each net is analyzed against each view. In other embodiments, other pruning criteria may be used, such as selecting views which cover a threshold percentage of nets, selecting a number of views which cover the highest number of nets, or other such pruning criteria. In some such embodiments, not every dominant view may be selected. For example, view 3 may be selected from table 2 as being the worst case for three nets while view 2 is rejected as only being the worst-case for two nets. Further still, in other embodiments, various combinations of criteria may be used to achieve efficient pruning of views while limiting expected errors for a particular circuit design.

Experimental results for multiple different circuit designs indicate an increase in processing speed for TAT of between 150% and 600% with a small increase in test analysis error. In one implementation, computing time was reduced from 26.4 hours to 9.8 hours, with comparable end results. Embodiments thus improve the operation of a computing device performing circuit design analysis and verification using view pruning operations as described herein.

Figure 10:
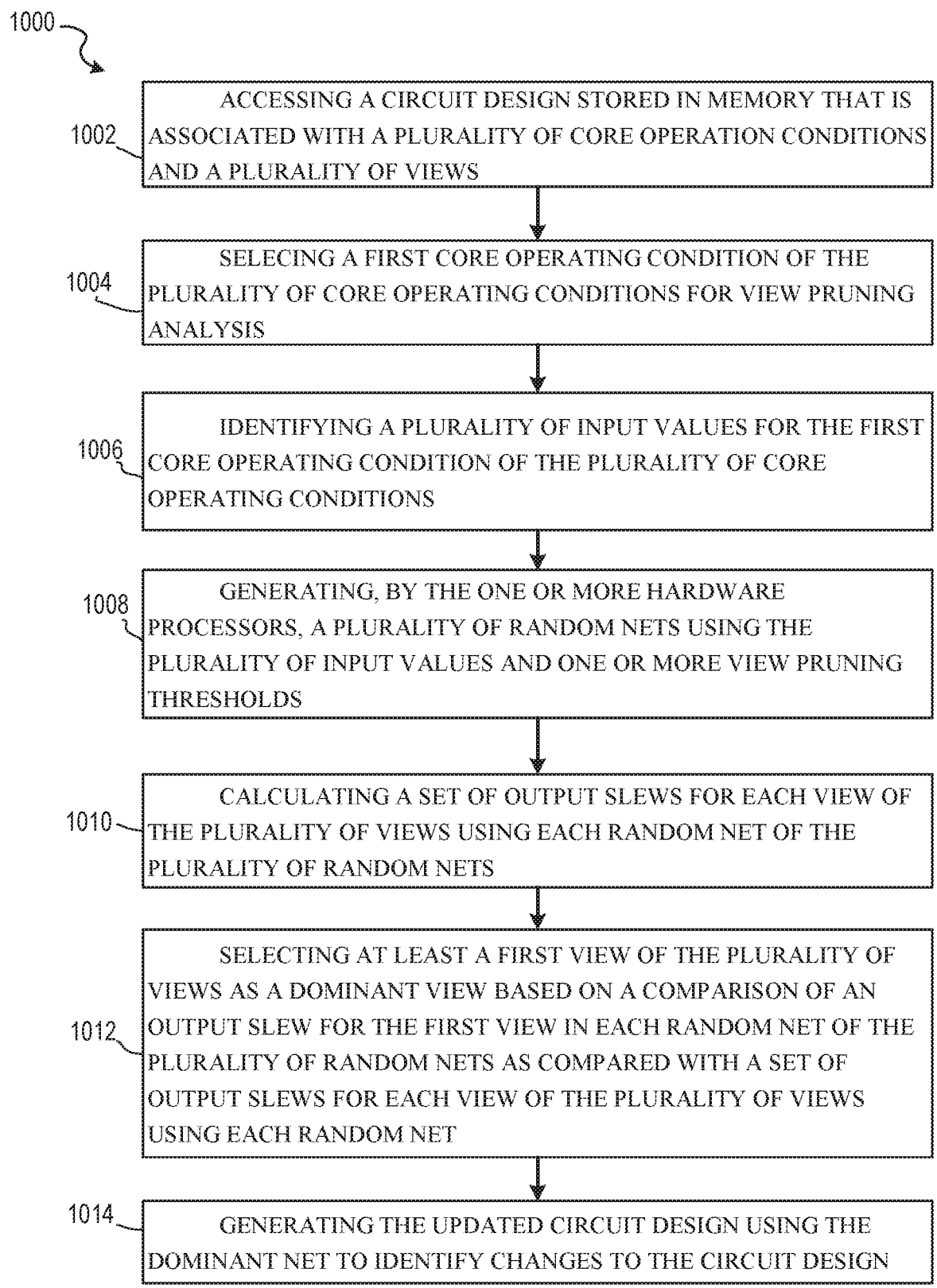
FIG. 10 is an example method of view pruning for routing tree optimization in accordance with some example embodiments.

FIG. 10 is an example method of view pruning as part of operations for generating circuits and associated circuit designs according to some example embodiments. In some embodiments, method 1000 is a method performed by an EDA computing device to generate design files for a circuit design. In some embodiments, method 1000 is represented by instructions stored in a memory of an EDA computing device or in a non-transitory computer-readable medium, where the instructions cause the EDA computing device to perform method 1000 when executed by one or more processors.

Method 1000 begins with operation 1002 accessing, using one or more hardware processors, a circuit design stored in memory that is associated with a plurality of views a plurality of core conditions (e.g. conditions associated with core runs). As described above, the views and core conditions are associated with different operating circumstances which a device may encounter during operation. The views include information that a standard set of test criteria will analyze in an attempt to confirm that all expected operating conditions will result in correct function of the circuit. The circuit design stored in memory will also include information about circuit elements, routing limitations, and other information, such as input data and circuit design criteria and threshold information for view pruning which is particular to a particular circuit. Operation 1004 then involves selecting, by the one or more hardware processors, a first core condition of the plurality of core conditions for view pruning analysis. In some embodiments, information for different core conditions may be processed in parallel. Regardless, each view for a circuit design may eventually be processed in repeated or parallel operations to analyze the views under various core conditions using random nets and select dominant views and prune the non-dominant views or other combinations of views not needed for a given level of confidence in an intermediate timing analysis. In operation 1006, for the selected views, a plurality of input values for the first core condition of the plurality of core conditions is identified. This information may simply be part of the circuit design data stored in memory, or may come from information that is part of a view pruning system.

Once the input information needed for view pruning is identified, operation 1008 involves generating, by the one or more hardware processors, random nets for the first core operating condition using the plurality of input values for the first core condition and one or more view pruning thresholds. As described in additional detail above, generation of random nets uses the input information to create and test random fanouts (e.g., placements of receiver circuit elements connected to a driver), and select a fanout as a random net once a set of criteria are met. In one embodiment, the criteria is that a slew rate for each receiver circuit element is below a maximum window value for each circuit element (where each circuit element may have its own window, which may be different than other windows), and where at least one circuit element in the selected fanout has a slew rate that is below a minimum value for that circuit element's slew rate window.

Once the fanout is determined for the set of nets, operation 1010 involves calculating, by the one or more hardware processors, an output slew for the each view using each random net generated for the core operating condition. This output slew is a worst output slew for a particular view. A single random net may calculate different "worst" slew values for different views, where the "worst" value is the lowest performance according to the criteria established for a particular design (e.g., a greater slew value is typically a worse performance value). Operation 1012 then involves selecting, by the one or more hardware processors, the first view as a dominant view based on a comparison of the output slews for combinations of each view and each random net. Other views may be selected as non-dominant views and "pruned". Such pruned views are not used in determining performance characteristics or in generating updates for a design based on test results. The design updates using the non-pruned (e.g. dominant) views then occurs in operation 1014.

In some embodiments, the operations then proceed with generating or initiating generation of a set of masks from the updated circuit design for use in generating an integrated circuit comprising the updated circuit design. The component arrangement defined and generated in the above operations may then be used to fabricate (e.g., generate) or initiate generation of an integrated circuit using the component arrangement. In various embodiments, various devices, systems, and methods are used to fabricate devices based on the updated circuit design. In some embodiments, this includes generation of masks and the use of machinery for circuit fabrication. In various implementations, files generated by embodiments described herein are used to create photolithographic masks for lithography operations used to generate circuits according to a circuit design, where a pattern defined by the masks is used in applying a thin uniform layer of viscous liquid (photo-resist) on the wafer surface. The photo-resist is hardened by baking and then selectively removed by projection of light through a reticle containing mask information. In some implementations, the files are further used for etching patterning, where unwanted material from the surface of the wafer is removed according to details described in the design files, where a pattern of the photo-resist is transferred to the wafer by means of etching agents. In some embodiments, aspects of design files generated according to the operations described herein are used for deposition operations, where films of the various materials are applied on the wafer. This may involve physical vapor deposition (PVD), chemical vapor deposition (CVD) or any such similar processes. Some embodiments may use files generated according to operations described herein for chemical mechanical polishing, where a chemical slurry with etchant agents is used to planarize to the wafer surface, for oxidation where dry oxidation or wet oxidation molecules convert silicon layers on top of the wafer to silicon dioxide, for ion implantation where dopant impurities are introduced into a semiconductor using a patterned electrical field, or for diffusion where bombardment-induced lattice defects are annealed. Thus, in various embodiments, systems and operations include not only computing devices for generating updated circuit design files, but also hardware systems for fabricating masks, controlling IC fabrication hardware, and the hardware and operations for fabricating a circuit from a circuit design (e.g., component arrangement) generated in accordance with various embodiments described herein.

In addition to the operations described above, some embodiments may operate where the plurality of input values for the first view comprise a set of first driver values, a set of first receiver values, a distance threshold value defining a size of the first random net, and a maximum target input slew value. Similarly, some embodiments may function where the plurality of input values for the first view further comprises a target fanout value indicating a number of circuit elements for a first random fanout of the first random net. Other embodiments may use additional or alternate inputs. Some embodiments also operate where the one or more view pruning thresholds comprises a slew window maximum value for each circuit element of the first random net, and a slew window minimum value for said each circuit element of the first random net. Some embodiments may also function where the operation for generating the first random net for the first view using the plurality of input values for the first view and the one or more view pruning thresholds comprises operations on each circuit element, where for said each circuit element of the first random fanout, a distance value between zero and the distance threshold value to generate the first random fanout, and a slew value for each circuit element of the first random fanout, are calculated.

In addition to the embodiments above, some embodiments may involve further operations including rejecting the first random fanout based on the slew value for said each circuit element of the first random fanout and a first view pruning threshold, and selecting a second random fanout value indicating a second number of circuit elements for a second random fanout that is different from the number of circuit elements for the first random fanout. Then, for each circuit element of the second random fanout, selecting an associated distance value between zero and the distance threshold value to generate the second random fanout, calculating an associated slew value for said each circuit element of the second random fanout, and selecting the second random fanout based on the associated slew value for each circuit element of the second random fanout meeting the first view pruning threshold. Some embodiments further operate where the first random fanout is rejected based on a first slew value for a first circuit element of the first random value exceeding the slew window maximum value. Some such embodiments may operate where the first random fanout is rejected based on each slew value for each circuit element of the first random value being below the slew window minimum value.

Some embodiments may include further operations which include accepting the first random fanout based on each slew value for each circuit element of the first random fanout being below the slew window maximum value and one or more slew values for the circuit elements of the first random fanout being above the slew window minimum value, and calculating the output slew for the first random net based on the first random fanout. Some such embodiments further involve calculating an associated output slew for each view of the plurality of views using a plurality of random nets generated with associated random fanouts, and selecting one or more dominant views associated with nets of the plurality of random nets having a worst slew value for at least one view of the plurality of views.

In some embodiments, the worst slew value for each view of the plurality of views is selected as an unscaled slew value of a corresponding random net. In other embodiments, the worst slew value for each view of the plurality of views is selected as a scaled slew value of a corresponding random net based on scaling values associated with a target slew for the updated circuit design. In still further embodiments, other criteria or additional criteria may be used for determining a worst slew criteria. In some embodiments, pruning slew criteria may be set for coverage of a percentage of views rather than all views, or may be set for views or nets which describe a majority of the worst case operation circumstances. In other embodiments, other criteria or combinations are used.

In some embodiments the circuit design comprises a plurality of routes, and wherein the plurality of routes consists of one or more trunk routes and one or more leaf routes. In some embodiments, the plurality of core conditions comprise a clock tree core conditions, a power domain core conditions, and one or more sets of routing core conditions.

For selection of circuit element values such as driver values, buffer element values, receiver values, or other such values, some embodiments may operate as follows. The set of first driver values comprises selected buffer values or a weakest buffer element, a strongest buffer element, or an intermediate buffer element. The set of first driver values further comprises an intermediate clock gate element. The weakest buffer element, a strongest buffer element, the intermediate buffer element, and the intermediate clock gate element are further selected from data for a plurality of buffer, inverter, and clock gate circuit elements. In some such embodiments, the set of first receiver values is selected based on a classification of an associated view as corresponding to a leaf routing or a trunk routing.

As described above, some such embodiments may operate for selection of random nets for views using the plurality of input values for the view and one or more view pruning thresholds by generating a first random fanout comprising a first plurality of circuit elements by selecting a distance value between zero and the distance threshold value for each circuit element of the first plurality of circuit elements, calculating a slew value for each circuit element of the first plurality of circuit elements, and repeatedly generating random fanouts with varying numbers of circuit elements until the slew value for each circuit element of a selected random fanout meets the one or more view pruning thresholds.

Additionally, it will be apparent that any apparatus or operations described herein in accordance with various embodiments may be structured with intervening, repeated, or other elements while still remaining within the scope of the contemplated embodiments. Some embodiments may include multiple receivers, along with any other circuit elements. Some embodiments may function with described operating modes as well as other operating modes. The various embodiments described herein are thus presented as examples, and do not exhaustively describe every possible implementation in accordance with the possible embodiments.

FIG. 11 is a block diagram 1100 illustrating an example of a software architecture 1102 that may be operating on an EDA computer and used with methods for modifying a balanced clock structure, according to some example embodiments. Software architecture 1102 can be used as an electronic design automation computing device to implement any of the methods described above. Aspects of software architecture 1102 may, in various embodiments, be used to store circuit designs and execute timing analysis or optimization in an EDA environment to generate circuit designs, with physical devices generated using these circuit designs.

FIG. 11 non-limiting example of a software architecture 11 1102, and it will be appreciated that many other architectures can be implemented to facilitate the functionality described herein. In various embodiments, the software architecture 1102 is implemented by hardware such as machine 1200 that includes processors 1210, memory 1230, and input/output (I/O) components 1250. In this example, the software architecture 1102 can be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke application programming interface (API) calls 1112 through the software stack and receive messages 1114 in response to the API calls 1112, consistent with some embodiments. In various embodiments, any client device, server computer of a server system, or any other device described herein may operate using elements of software architecture 1102. An EDA computing device described herein may additionally be implemented using aspects of the software architecture 1102, with the architecture 1102 adapted for operating to perform clock synthesis and modification of balanced clock structures in accordance with embodiments herein.

In one embodiment, an EDA application of applications 1110 performs routing tree generation and/or adjustments, according to embodiments described herein, using various modules within software architecture 1102. For example, in one embodiment, an EDA computing device similar to machine 1200 includes memory 1230 and one or more processors 1210. The processors 1210 implement a view pruning module 1142 to improve routing tree synthesis in some embodiments. The processors 1210 also implement additional EDA module(s) 1144 to implement various circuit design operations. The design is finalized by an output module 1146 if the criteria/design thresholds are met.

In some embodiments, processor-implemented output module 1146 may then be used to update a display of I/O components 1250 of the EDA computing device with data associated with the updated routing tree generated by the process.

In various other embodiments, rather than being implemented as modules of one or more applications 1110, some or all of modules 1142, 1144, and 1146 may be implemented using elements of libraries 1106 or operating system 1104.

In various implementations, the operating system 1104 manages hardware resources and provides common services. The operating system 1104 includes, for example, a kernel 1120, services 1122, and drivers 1124. The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 such as libraries of multi-instance blocks for use in an EDA environment or other libraries that can provide functions such as memory allocation functions, string manipulation functions, mathematic functions, and the like. In addition, the libraries 1106 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1106 may also include other libraries 1134.

The software frameworks 1108 provide a high-level common infrastructure that can be utilized by the applications 1110, according to some embodiments. For example, the software frameworks 1108 provide various graphic user interface (GUI) functions, high-level resource management, high-level location services, and so forth. The software frameworks 1108 can provide a broad spectrum of other APIs that can be utilized by the applications 1110, some of which may be specific to a particular operating system 1104 or platform. In various embodiments, the systems, methods, devices, and instructions described herein may use various files, macros, libraries, and other elements of an EDA design environment to implement analysis described herein. This includes analysis of input design files for an integrated circuit design, along with any element of view pruning, testing, and design updating that may be used as part of or along with the embodiments described herein. While netlist files, library files, SDC files and view definition files are examples that may operate within a software architecture 1102, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1200 including processors 1210), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 1200, but deployed across a number of machines 1200. In some example embodiments, the processors 1210 or processor-implemented modules are located in a single geographic location (e.g., within a home environment, an office environment, or a server farm). In other example embodiments, the processors 1210 or processor-implemented modules are distributed across a number of geographic locations.

Figure 12:
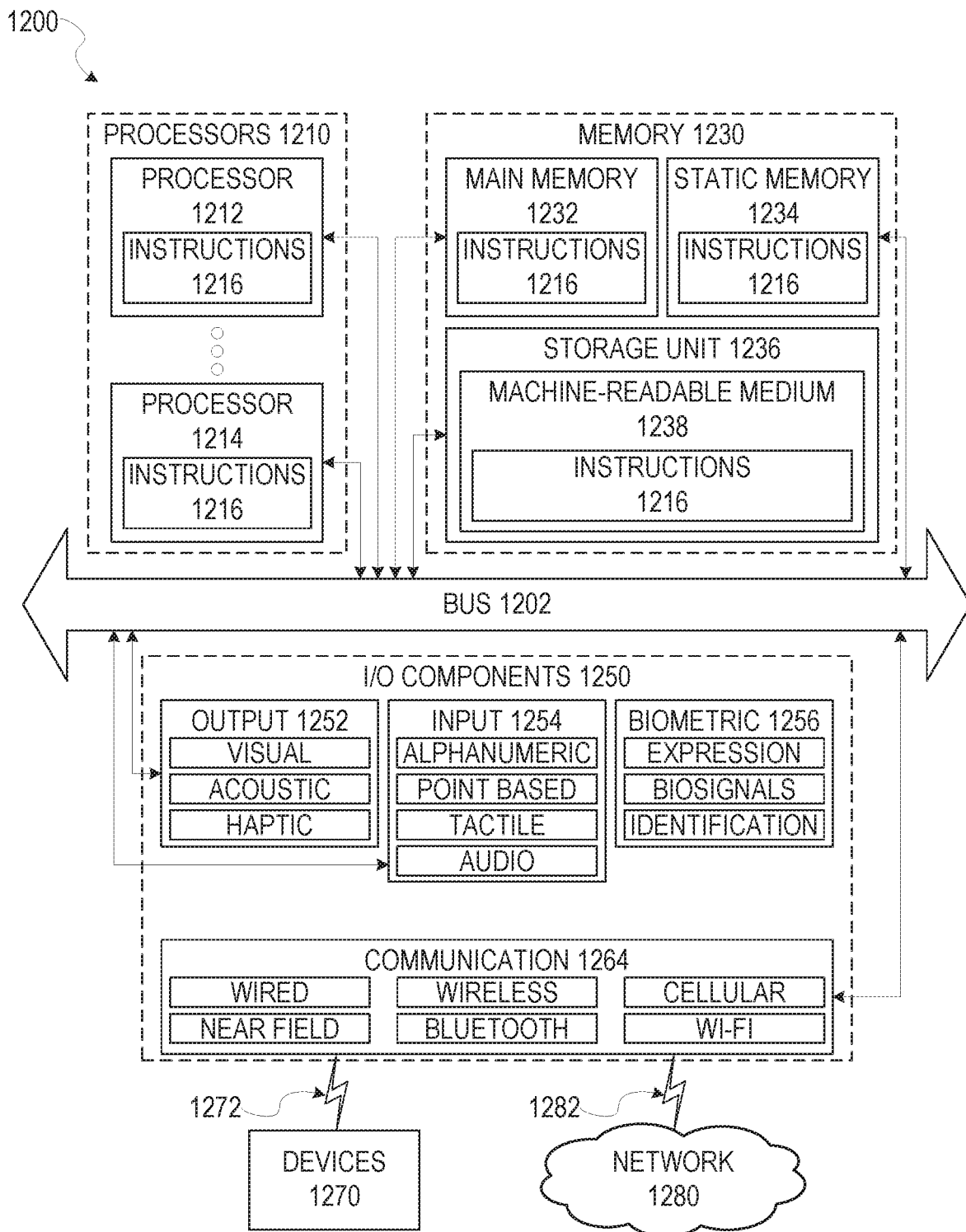
FIG. 12 is a diagrammatic representation of a machine in the form of a computer system within which a set of instructions are executed, causing the machine to perform any one or more of the methodologies discussed herein, according to some example embodiments.

FIG. 12 is a diagrammatic representation of the machine 1200 in the form of a computer system within which a set of instructions may be executed for causing the machine 1200 to perform any one or more of the methodologies discussed herein, according to an example embodiment. FIG. 12 shows components of the machine 1200, which is, according to some embodiments, able to read instructions from a machine-readable medium (e.g., a machine-readable storage medium) and perform any one or more of the methodologies discussed herein. In some embodiments, the machine 1200 may operate with instructions 1216 (e.g., software, a program, an application, an applet, an app, or other executable code) for causing the machine 1200 to perform any one or more of the methodologies discussed. In alternative embodiments, the machine 1200 operates as a standalone device or can be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

In various embodiments, the machine 1200 comprises processors 1210, memory 1230, and I/O components 1250, which can be configured to communicate with each other via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 1212 and a processor 1214 that may execute the instructions 1216. The term "processor" is intended to include multi-core processors 1210 that may comprise two or more independent processors 1212, 1214 (also referred to as "cores") that can execute instructions 1216 contemporaneously. Although FIG. 12 shows multiple processors 1210, the machine 1200 may include a single processor 1212 with a single core, a single processor 1212 with multiple cores (e.g., a multi-core processor 1212), multiple processors 1210 with a single core, multiple processors 1210 with multiples cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any one or more of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown, in an example embodiment, to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions 1216, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various example embodiments, the I/O components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g, a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow 100, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements," "design elements," and other aspects of a circuit design refer to selectable values that are set as part of the design of a circuit. Such design requirements or elements may be adjusted by a system operator or circuit designer to suit the particular goals of a project or circuit that results from the operations described herein.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, communication components 1264 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1270 may be another machine or any of a wide variety of peripheral devices (e.g., a peripheral device coupled via a USB).

Transmission Medium

In various example embodiments, one or more portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long Term Evolution (LTE) standard, others defined by various standard-setting organizations, other long range protocols, or other data transfer technology.

Furthermore, the machine-readable medium 1238 is non-transitory (in other words, not having any transitory signals) in that it does not embody a propagating signal. However, labeling the machine-readable medium 1238 "non-transitory" should not be construed to mean that the medium 1238 is incapable of movement; the medium 1238 should be considered as being transportable from one physical location to another. Additionally, since the machine-readable medium 1238 is tangible, the medium 1238 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A computer-implemented method comprising:
    accessing, using one or more hardware processors, a circuit design stored in memory that is associated with a plurality of core operating conditions and a plurality of views;
    selecting, by the one or more hardware processors, a first core operating condition of the plurality of core operating conditions for view pruning analysis;
    identifying, by the one or more hardware processors, a plurality of input values for the first core operating condition of the plurality of core operating conditions;
    generating, by the one or more hardware processors, a plurality of random nets using the plurality of input values and one or more view pruning thresholds;
    calculating, by the one or more hardware processors, a set of output slews for each view of the plurality of views using each random net of the plurality of random nets;

selecting, by the one or more hardware processors, at least a first view of the plurality of views as a dominant view based on a comparison of an output slew for the first view in each random net of the plurality of random nets as compared with a set of output slews for each view of the plurality of views using each random net; and generating, by the one or more hardware processors, an updated circuit design using the dominant view to identify changes to the circuit design.

2. The computer-implemented method of claim 1, wherein the plurality of input values comprise:
a set of first driver values;
a set of first receiver values;
a distance threshold value defining a size of the first random net; and
a maximum target input slew value.

3. The computer-implemented method of claim 2 wherein the plurality of input values further comprises a target fanout value indicating a number of circuit elements for a first random fanout of the first random net, and
wherein the one or more view pruning thresholds comprises:
a slew window maximum value for each circuit element of the first random net; and
a slew window minimum value for said each circuit element of the first random net.

4. The computer-implemented method of claim 3 wherein generating the first random net for the first view using the plurality of input values for the first view and the one or more view pruning thresholds comprises:
for said each circuit element of the first random fanout, selecting a distance value between zero and the distance threshold value to generate the first random fanout; and
calculating a slew value for each circuit element of the first random fanout.

5. The computer-implemented method of claim 4 further comprising:
rejecting the first random fanout based on the slew value for said each circuit element of the first random fanout and a first view pruning threshold;
selecting a second random fanout value indicating a second number of circuit elements for a second random fanout that is different from the number of circuit elements for the first random fanout;
for each circuit element of the second random fanout, selecting an associated distance value between zero and the distance threshold value to generate the second random fanout;
calculating an associated slew value for said each circuit element of the second random fanout; and
selecting the second random fanout based on the associated slew value for each circuit element of the second random fanout meeting the first view pruning threshold.

6. The computer-implemented method of claim 5 wherein the first random fanout is rejected based on a first slew value for a first circuit element of the first random fanout exceeding the slew window maximum value.

7. The computer-implemented method of claim 5 wherein the first random fanout is rejected based on each slew value for each circuit element of the first random fanout being below the slew window minimum value.

8. The computer-implemented method of claim 4, further comprising:
accepting the first random fanout based on each slew value for each circuit element of the first random fanout being below the slew window maximum value and one or more slew values for the circuit elements of the first random fanout being above the slew window minimum value; and
calculating the output slew for the first random net based on the first random fanout.

9. The computer-implemented method of claim 8, further comprising:
calculating an associated output slew for each view of the plurality of views using the plurality of random nets generated with associated random fanouts; and
selecting one or more dominant views associated with nets of the plurality of random nets with the one or more dominant views having a worst slew value for at least one net of the plurality of random nets.

10. The computer-implemented method of claim 9 wherein the worst slew value for each view of the plurality of views is selected as an unscaled slew value of a corresponding random net.

11. The computer-implemented method of claim 9 wherein the worst slew value for each view of the plurality of views is selected as a scaled slew value of a corresponding random net based on scaling values associated with a target slew for the updated circuit design.

12. The computer-implemented method of claim 2 wherein the distance threshold is a maximum driver-receiver Manhattan length.

13. The computer-implemented method of claim 1 wherein the circuit design comprises a plurality of routes, and wherein the plurality of routes consists of one or more trunk routes and one or more leaf routes.

14. The computer-implemented method of claim 1, further comprising generating a set of masks from the updated circuit design for use in generating an integrated circuit comprising the updated circuit design.

15. A device for generating an updated circuit design, the device comprising:
a memory configured to store a circuit design comprising a plurality of core operating conditions and a plurality of views; and
one or more processors coupled to the memory and configured to perform operations comprising:
performing, for each of the plurality of core operating conditions, a core timing run, wherein the core timing run for each of the plurality of core conditions comprises:
selecting a first core operating condition of the plurality of core operating conditions for view pruning analysis;
identifying a plurality of input values for the first core operating condition of the plurality of core operating conditions;
generating a plurality of random nets using the plurality of input values and one or more view pruning thresholds; and
calculating a set of output slews for each view of the plurality of views using each random net of the plurality of random nets;
selecting at least one or more views of the plurality of views as a dominant view based on a comparison of an output slew for the first view in each random net of the plurality of random nets as compared with a set of output slews for each view of the plurality of views using each random net for each of the plurality of core operating conditions; and
generating an updated circuit design using the dominant view to identify changes to the circuit design.

16. The device of claim 15 wherein the plurality of core operating conditions comprise a clock tree condition, a power domain condition, and one or more routing conditions.

17. The device of claim 15 wherein the set of first driver values comprises selected buffer values or a weakest buffer element, a strongest buffer element, or an intermediate buffer element,
   wherein the set of first driver values further comprises an intermediate clock gate element; and
   wherein the weakest buffer element, the strongest buffer element, the intermediate buffer element, and the intermediate clock gate element are further selected from data for a plurality of buffer, inverter, and clock gate circuit elements.

18. The device of claim 15 wherein the set of first receiver values is selected based on a classification of an associated view as corresponding to a leaf routing or a trunk routing.

19. A non-transitory computer-readable medium comprising instructions that, when executed by one or more processors of an electronic design automation (EDA) computing device, cause the device to perform operations comprising:
   accessing a circuit design stored in memory that is associated with a plurality of core operating conditions, a plurality of views, and a plurality of routes, wherein the plurality of routes comprises of one or more trunk routes or one or more leaf routes;
   selecting a first core operating condition of the plurality of core operating conditions for view pruning analysis;
   identifying a plurality of input values for the first core operating condition of the plurality of core operating conditions;
   generating a plurality of random nets using the plurality of input values and one or more view pruning thresholds;
   calculating a set of output slews for each view of the plurality of views using each random net of the plurality of random nets;
   selecting at least a first view of the plurality of views as a dominant view based on a comparison of an output slew for the first view in each random net of the plurality of random nets as compared with a set of output slews for each view of the plurality of views using each random net; and
   generating an updated circuit design using the dominant view to identify changes to the circuit design.

20. The non-transitory medium of claim 19, wherein the instructions cause the device to perform further operations comprising generating the first random net for the first view using the plurality of input values for the first view and one or more view pruning thresholds by:
   generating a first random fanout comprising a first plurality of circuit elements by selecting a distance value between zero and the distance threshold value for each circuit element of the first plurality of circuit elements;
   calculating a slew value for each circuit element of the first plurality of circuit elements; and
   repeatedly generating random fanouts with varying numbers of circuit elements until the slew value for each circuit element of a selected random fanout meets the one or more view pruning thresholds.

* * * * *